June 24, 1947.   H. HEMMING   2,422,782
OVERHEAD AIR DISTRIBUTING DUCT FOR A VEHICLE HAVING
A MEANS FOR MIXING COLD AND RECIRCULATED AIR
Filed Sept. 26, 1944
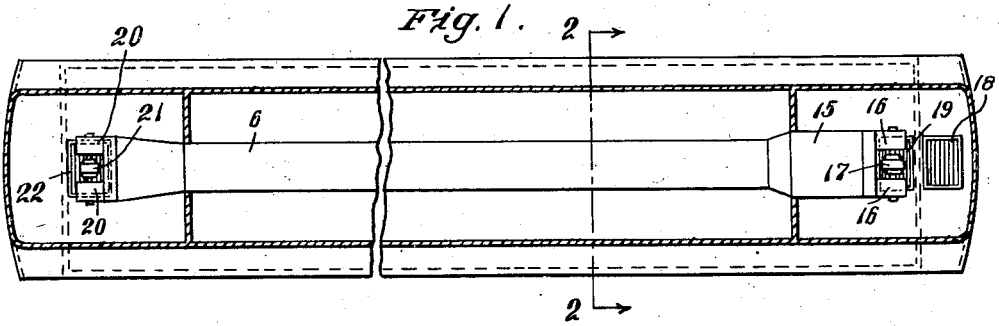
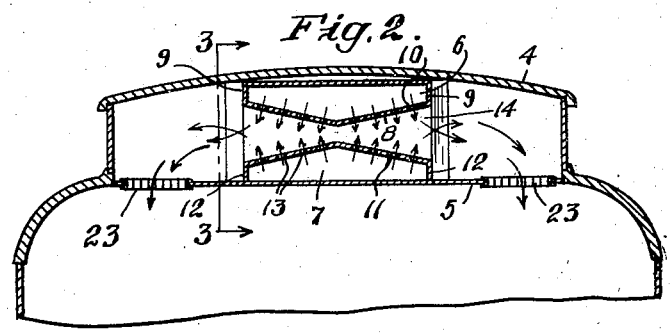
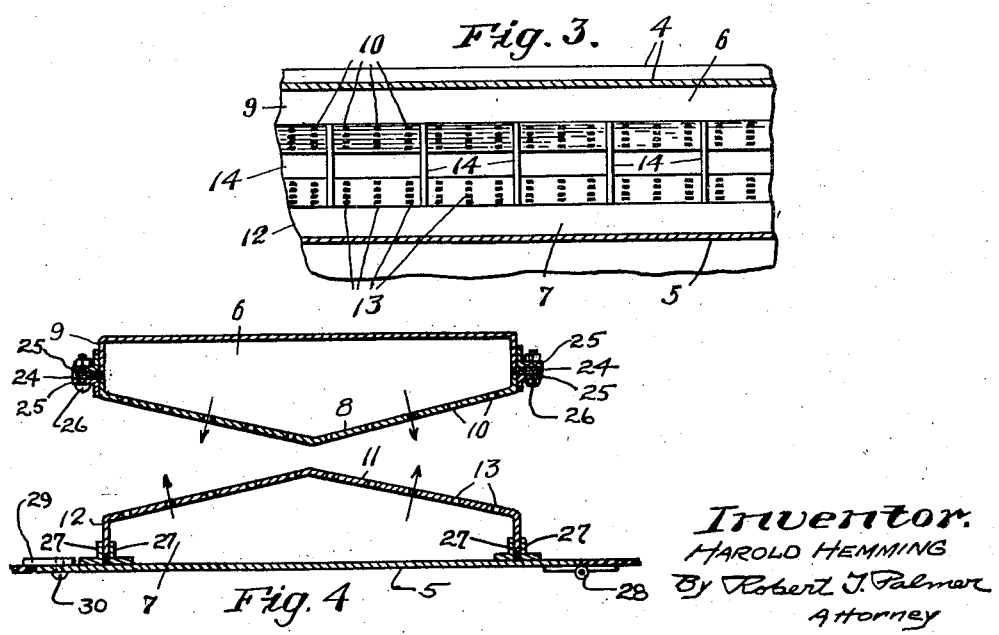
Inventor.
HAROLD HEMMING
By Robert J. Palmer
Attorney Patented June 24, 1947

2,422,782

UNITED STATES PATENT OFFICE 2,422,782

OVERHEAD AIR DISTRIBUTING DUCT FOR VEHICLES HAVING MEANS FOR MIXING COLD AND RECIRCULATED AIR

Harold Hemming, Dedham, Mass., assignor to B. F. Sturtevant Company, Hyde Park, Boston, Mass.

Application September 26, 1944, Serial No. 555,793

3 Claims. (Cl. 98—10)

This invention relates to air conditioning systems and relates more particularly to air conditioning systems for passenger vehicles such as railway passenger cars.

The S. M. Anderson Patent No. 2,204,114 discloses an air conditioning system of the most advanced type for railway passenger cars. A low dew point temperature is maintained in a refrigerant dehumidifier for ensuring low humidities in the air delivered to the passenger space, and the dehumidified air is reheated by mixture with air recirculated from the passenger space, in an overhead distributing duct.

This invention represents an improvement over that of said Anderson patent in that the dehumidified air is more thoroughly mixed with, and reheated by, the recirculated air.

An object of this invention is to mix cold dehumidified air with an overhead distributing duct structure, thoroughly with recirculated air for reheating the dehumidified air.

Another object of the invention is to distribute air chilled to a low dew point temperature, into the passenger space of a passenger vehicle, without drafts.

The invention will now be described with reference to the drawing, of which:

Fig. 1 is a plan view, partially in section, looking downwardly upon a railway passenger car embodying this invention;

Fig. 2 is a sectional view along the lines 2—2 of Fig. 1;

Fig. 3 is a fragmentary sectional view along the lines 3—3 of Fig. 2, and

Fig. 4 is an enlarged view of a modified form of duct structure which may be substituted for that shown by Figs. 1-3.

In the clerestory space of the car, between the roof 4 and the ceiling 5 thereof, the upper duct 6 and the lower duct 7 are arranged over the longitudinal center of the car.

The upper duct 6 has the lower walls 8 which connect at the center of the duct and which extend upwardly to connect with the vertical sides 9 of the duct 6. Each of the walls 8 has the spaced circular perforations 10 therein formed with axes perpendicular to their respective wall 8.

The lower duct 7 has the upper walls 11 which connect at the center of the duct 7 and which extend downwardly to connect with the vertical sides 12 of the duct 7. Each of the walls 11 has the spaced circular perforations 13 therein formed with axes perpendicular to their respective wall 11.

The upper walls 11 of the lower duct 7 are spaced from the lower walls 8 of the upper duct 6 to form therebetween spaces for the thorough mixing of the air streams discharged through the perforations 13 from the duct 7 and through the perforations 10 from the duct 6.

The duct 7 is supported on the ceiling 5 and supports the duct 6 by means of the spaced supports 14.

The upper duct 6 connects with the discharge outlet of the refrigerative dehumidifier 15 arranged in one end of the car and which may be similar to that disclosed in said Anderson patent. The dehumidifier 15 has the blowers 16 driven by the electric motor 17 and which draw outdoor air through the grille 18 and recirculated air from the passenger space through the grille 19, and force the mixed air through the dehumidifier and into the duct 6.

The lower duct 7 connects with the blowers 20 in the other end of the car, which blowers are driven by the electric motor 21, and which draw recirculated air from the passenger space, through the grille 22 and force it into the duct 7.

The opposite sides of the ceiling 5 have the air outlet grilles 23 formed therein.

In operation, the dehumidified air streams from the duct 6 are projected into and thoroughly mixed with the recirculated air streams from the duct 7. The mixed air is discharged at low velocity through the grilles 25 into the passenger space.

The recirculated air from the duct 7 acts as "by-pass" air and adds sensible heat to the chilled, dehumidified air so that when the mixed air reaches the passenger space, it has a sufficiently high dry bulb temperature so that it causes no discomfort to the passengers.

The perforations 10 and 13 in the ducts 6 and 7 respectively are so small that substantial static pressures are built up in the ducts with the result that the distribution of air therefrom is uniform throughout their lengths.

While heat insulation has not been illustrated, it could, of course, be used in the clerestory space of the car for decreasing losses due to the sun effect of the roof and sides of the car.

Fig. 4 illustrates a preferred form of duct structure which is adapted to have its interior cleaned at intervals. The upper duct 6 is divided into upper and lower sections by having the vertical walls 9 formed in upper and lower sections spaced apart by the gaskets 24. The flanges 25 are attached as by welding or brazing to the walls 9 on opposite sides of the gaskets 24 and the bolts 26 pass through bores in the flanges and clamp the two sections together. By removing the bolts 26 the lower duct section can be dropped down thus enabling the interior to be cleaned. The upper wall of the duct 6 may be bolted to the roof of the car.

The ceiling 5 of the car has the flanges 27 attached thereto, the flanges 27 being in pairs, the flanges of each pair having vertical sides spaced apart the width of the vertical sides 12 of the duct 7 whereby the lower ends of the sides 12 fit snugly between the flanges as illustrated by Fig. 4.

The portion of the ceiling 5 under the duct 7 is separated from the remainder of the ceiling and is connected thereto at one side by the hinge 28, and is supported thereto at the other side by the overlapping plate 29. The plate 29 can be shifted by one half turn of the screw 30 permitting the hinged portion of the ceiling to swing downwardly whereupon the walls 12 may be removed from the flanges 27 for providing access to the interior of the duct for cleaning.

The ducts 6 and 7 preferably for ease in handling, should not be continuous from one end of the car to the other but should be divided into say ten foot lengths, adhesive tape such as "Scotch" tape being used for sealing the spaces between the duct divisions.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. An air conditioning system for an area to be conditioned, said area having a ceiling, comprising a pair of superimposed aligned ducts enclosed in the space above said ceiling, the upper of said ducts having a lower wall spaced above the upper wall of the lower of said ducts, means for chilling air, means for supplying the chilled air, under pressure, into one of said ducts, means for supplying air recirculated from the space served with conditioned air, under pressure, into the other of said ducts, said walls having a plurality of apertures formed therein for projecting air from said ducts into the space therebetween, and means forming outlets in said ceiling on opposite sides of said ducts and extending parallel thereto for distributing into said space, the mixed air from said ducts.

2. An air conditioning system comprising a pair of superimposed aligned ducts, the upper of said ducts having a lower wall spaced above, and which converges at the center thereof towards, the upper wall of the lower of said ducts, said upper wall converging at the center thereof towards said lower wall, means for chilling air, means for supplying the chilled air, under pressure, into one of said ducts, means for supplying air recirculated from the space served with conditioned air, under pressure, into the other of said ducts, said walls having a plurality of apertures formed therein for projecting air from said ducts into the space therebetween, said space having a ceiling below the lower of said ducts, and means forming an outlet in said ceiling to one side of said ducts and extending parallel thereto for distributing into said space, the mixed air from said ducts.

3. An air conditioning system comprising a pair of superimposed aligned ducts, the upper of said ducts having a lower wall spaced above, and which converges at the center thereof towards, the upper wall of the lower of said ducts, said upper wall converging at the center thereof towards said lower wall, means for chilling air, means for supplying the chilled air, under pressure, into one of said ducts, means for supplying air recirculated from the space served with conditioned air, under pressure, into the other of said ducts, said walls having a plurality of apertures formed therein for projecting air from said ducts into the space therebetween, said space having a ceiling below the lower of said ducts, and means forming outlets in said ceiling on opposite sides of said ducts and extending parallel thereto for distributing into said space, the mixed air from said ducts.

HAROLD HEMMING.

REFERENCES CITED

The following references are of record in the file of this patent:

UNITED STATES PATENTS

| Number | Name | Date |
|---|---|---|
| 2,204,114 | Anderson | June 11, 1940 |
| 2,262,243 | Lord | Nov. 11, 1941 |
| 2,251,682 | Leadbetter | Aug. 5, 1941 |